US011308986B2

(12) United States Patent
Araki et al.

(10) Patent No.: US 11,308,986 B2
(45) Date of Patent: Apr. 19, 2022

(54) EVENT BASED RECONCILE OPERATION FOR HIERARCHICAL STORAGE MANAGEMENT

(71) Applicant: International Business Machines Corporation, Armonk, NY (US)

(72) Inventors: Hiroshi Araki, Yokohama (JP); Takeshi Ishimoto, Kawasaki (JP); Hiroyuki Miyoshi, Kawasaki (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/990,190

(22) Filed: Aug. 11, 2020

(65) Prior Publication Data

US 2022/0051695 A1 Feb. 17, 2022

(51) Int. Cl.
| | |
|---|---|
| *G11B 5/008* | (2006.01) |
| *G11B 5/86* | (2006.01) |
| *G06F 16/11* | (2019.01) |
| *G11B 15/24* | (2006.01) |
| *G06F 16/185* | (2019.01) |

(52) U.S. Cl.
CPC .............. *G11B 5/86* (2013.01); *G06F 16/119* (2019.01); *G06F 16/185* (2019.01); *G11B 5/00813* (2013.01); *G11B 15/24* (2013.01)

(58) Field of Classification Search
None
See application file for complete search history.

(56) References Cited

U.S. PATENT DOCUMENTS

| | | | | |
|---|---|---|---|---|
| 6,105,037 | A | * | 8/2000 | Kishi ..................... G06F 3/0607 |
| 7,386,552 | B2 | * | 6/2008 | Kitamura ................ G06F 16/10 |

(Continued)

FOREIGN PATENT DOCUMENTS

| | | |
|---|---|---|
| CN | 109558456 A | 4/2019 |
| WO | 20181831181 W | 10/2018 |

OTHER PUBLICATIONS

"Patent Cooperation Treaty PCT Notification of Transmittal of the International Search Report and the Written Opinion of the International Searching Authority, or the Declaration", Applicant's file reference PF210464CT, International Application No. PCT/CN2021/111764, International Filing Date Aug. 10, 2021, dated Nov. 9, 2021, 10 Pgs.

(Continued)

*Primary Examiner* — Peter Vincent Agustin
(74) *Attorney, Agent, or Firm* — Donald G. Weiss; Alexander G. Jochym

(57) ABSTRACT

In an approach to automatically reconciling data in HSM without affecting system performance, responsive to migrating a file on a hierarchical storage system from a primary storage to one or more tape drives, one or more file migration records are recorded in a reconcile database. Responsive to the occurrence of a file event on the primary storage, the one or more file migration records in the reconcile database are updated. Responsive to receiving a command to unmount a first mounted tape on one of the one or more tape drives, a reconcile function is performed on the first mounted tape, wherein the reconcile function updates the first mounted tape with the one or more file migration records in the reconcile database.

20 Claims, 5 Drawing Sheets

(56) References Cited

U.S. PATENT DOCUMENTS

| | | | |
|---|---|---|---|
| 9,766,835 B2 | 9/2017 | Hasegawa et al. | |
| 2005/0015409 A1 | 1/2005 | Cheng et al. | |
| 2007/0283120 A1* | 12/2007 | Fujita | G06F 3/067 |
| | | | 711/170 |
| 2010/0088335 A1* | 4/2010 | Mimatsu | H04L 67/1097 |
| | | | 707/770 |
| 2018/0044501 A1 | 1/2018 | Tohru | |
| 2018/0246886 A1* | 8/2018 | Dragomirescu | G06F 16/214 |
| 2021/0064298 A1* | 3/2021 | Hasegawa | G06F 3/0611 |

OTHER PUBLICATIONS

"Automatic reconciliation", IBM Knowledge Center, Accessed Feb. 28, 2020, 2 pages, <https://www.ibm.com/support/knowledgecenter/en/SSSR2R_7.1.6/hsmul/c_recon_cfg_auto.html>.

"Event Types", Systems Management: Data Storage Management (XDSM) API, Copyright © 1997 The Open Group, 19 pages, <http://pubs.opengroup.org/onlinepubs/9657099/chap3.htm>.

"System and method for a owner, file type and directory specific HSM migration policy optimization", IP.com IPCOM000258925D. Prior Art Database Technical Disclosure, Disclosed Anonymously, Jun. 26, 2019, 10 pages.

"TSM HSM Explained", Oxford University TSM Symposium, 2003, 18 pages.

\* cited by examiner

EVENT TYPE: "DELETE" OR "RENAME"
FILE_PATH1:

WHEN EVENT TYPE IS "DELETE", THE FILE PATH OF THE DELETED FILE
    WHEN EVENT TYPE IS "RENAME", THE FILE PATH BEFORE RENAMING THE FILE

FILE_PATH2:
        WHEN EVENT TYPE IS "DELETE", EMPTY
        WHEN EVENT TYPE IS "RENAME", FILE PATH AFTER RENAMING THE FILE.

US 11,308,986 B2

EVENT BASED RECONCILE OPERATION FOR HIERARCHICAL STORAGE MANAGEMENT

BACKGROUND

The present invention relates generally to the field of data storage, and more particularly to automatically reconciling data in Hierarchical Storage Management (HSM) without affecting system performance.

Magnetic tape data storage is a system for storing digital information on magnetic tape using digital recording. The tapes are usually stored on cartridges or cassettes, but for drives that are used as data storage tape backups, the tape is often wound on reels. The Linear Tape Open single reel cartridge was announced in 1997 at a capacity 100 megabytes, and now in its eighth generation, it supports 12 terabytes in the same sized cartridge. The reason magnetic tape drives are still in use today, especially as an offline data backup, is because of long archival stability and very favorable unit costs.

SUMMARY

Embodiments of the present invention disclose a method, a computer program product, and a system for automatically reconciling data in HSM without affecting system performance. In one embodiment, responsive to migrating a file on a hierarchical storage system from a primary storage to one or more tape drives, one or more file migration records are recorded in a reconcile database. Responsive to the occurrence of a file event on the primary storage, the one or more file migration records in the reconcile database are updated. Responsive to receiving a command to unmount a first mounted tape on one of the one or more tape drives, a reconcile function is performed on the first mounted tape, wherein the reconcile function updates the first mounted tape with the one or more file migration records in the reconcile database.

DETAILED DESCRIPTION

Figure 1:
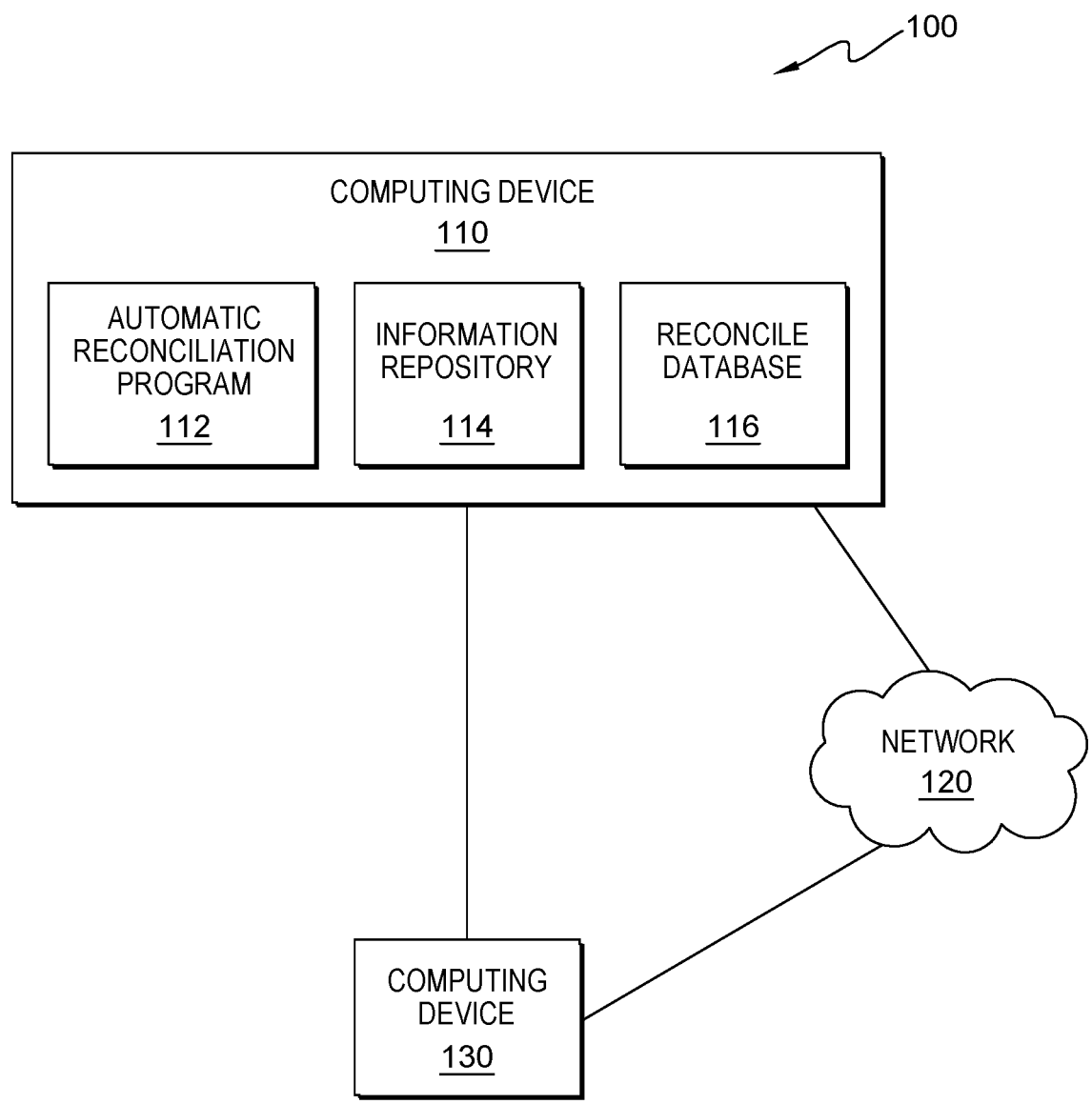
FIG. 1 is a functional block diagram illustrating a distributed data processing environment, in accordance with an embodiment of the present invention.

The Data Management Applications Programming Interface (DMAPI) is an interface used by the Systems Management: Data Storage Management (XDSM) specification which allows for special interfaces to the files in a storage system. The interface is file system independent, meaning that someone who creates a data management application that uses DMAPI can use it on any DMAPI file system. DMAPI was also originally implemented to allow unused files to be stored offline, usually on tape, until the file was requested. Once requested, the file was retrieved for use by the requesting user. An important feature of the DMAPI is the use of events to notify data management applications about operations on files. Events are one of the foundations of the DMAPI. In the event paradigm, the operating system informs a data management application running in user space when a particular event occurs. For example, a data management application in user space can request that it be notified whenever a read of a certain area of a file occurs. When the operating system determines that it is going to read data from the target area, it notifies the data management application via a DMAPI event. In this manner, data management applications can monitor and manage files and specific regions within those files.

Hierarchical storage management (HSM) is a data storage technique that automatically moves data between high-cost and low-cost storage media. The concept of HSM technology is similar to a memory cache in a computer, where the most actively used data is stored on expensive static random-access memory and the less frequently accessed data is stored on a much slower dynamic random-access memory.

HSM systems exist because high-speed storage devices, such as solid-state drive (SSD) arrays and hard disk drives, are more expensive per byte stored than slower devices, such as magnetic tape drives. While it would be ideal to have all data available on high-speed devices all the time, this is prohibitively expensive for many organizations. Instead, HSM systems store the bulk of the data on slower devices, and then copy data to faster disk drives when needed. In effect, HSM turns the fast disk drives into caches for the slower mass storage devices. The HSM system monitors the way data is used and makes best guesses as to which data can safely be moved to slower devices and which data should stay on the fast devices.

In a typical HSM scenario, data files which are frequently used are stored in primary storage, such as disk drives, including flash based SSM drives, but are eventually migrated to tape if they are not used for a certain period of time. If a user does reuse a file which is on tape, it is automatically moved back to primary storage. The advantage is that the total amount of stored data can be much larger than the capacity of the disk storage available, but since only rarely used files are on tape, most users will usually not notice any slowdown. The operation of moving a file stored on the primary storage to a tape is called migrate, whereas the operation of moving the file from the tape back to the primary storage is called recall. As a result of a migrate operation, the file on the primary storage is replaced with a stub file with a small amount of information.

When a stub file itself is deleted or renamed, such an event needs to be reproduced on the tape on which the file corresponding to the stub file has been recorded. This operation, called a reconcile, includes synchronization of the metadata of the stub file with the tape. A reconcile operation is generally performed asynchronously with the modifications of the stub file. In the current art, reconcile operations need to be performed manually, which entails scanning the entire file system to retrieve all the stub files and the metadata (e.g., file paths and extended attributes) associated with the stub files, comparing the result of the scan with the information about the files on the tape, and finally performing the metadata synchronization. Embodiments of the present invention allow for automating the reconcile function without affecting system performance.

A typical implementation of a reconcile operation begins by scanning the entire file system to retrieve all the stub files and the associated metadata of the stub files (e.g., file paths and extended attributes). Next, the results of the scanning are compared to the file information on the tape and a metadata synchronization is performed. Finally, based on the results of the comparison, files on the tape related to stub files not found in the scan are deleted, since the stub file was deleted off the primary storage, and for each stub file found on the primary storage, compare the metadata obtained by the scan of the stub files with the metadata of the corresponding file on the tape and update the metadata of the corresponding file on the tape with the metadata of the stub file on the primary storage.

The problem with this scan-based reconcile operation is that it requires a long execution time since the entire file system needs to be scanned for each reconcile operation. In addition, it suffers from a low efficiency because when only a certain tape needs to be reconciled, the entire file system needs to be scanned even if no change has occurred on the stub files related to that tape. Even worse, when a plurality of tapes needs to be reconciled, such as when the remaining free spaces of a plurality of tapes get short, the plurality of tapes need to be reconciled to increase the remaining free space. When a reconcile operation is performed on a plurality of tapes using the scan method of reconciliation, an excessive amount of time is required since the reconcile operation entails scanning the entire file system and exchanging tapes if the filesystem spans multiple tapes.

Embodiments of the present invention introduce a method to perform a reconcile automatically, without affecting system performance. Instead of scanning the filesystem, this implementation stores metadata events that need to be processed by a reconcile function into a database called a reconcile database. In an embodiment of this invention, each tape in the HSM has its own reconcile database.

In an embodiment of this event based reconcile, automatic reconcile is processed in the following cases: (1) when a tape is about to unmount and at least one event is found in the corresponding reconcile database; (2) when a tape is mounted to a drive and the drive is in the idle state for a pre-determined period of time and at least one event is found in the corresponding reconcile database; and (3) when a tape drive does not have a tape mounted and the drive is in the idle state for a pre-determined period of time. In the latter case, the system chooses the tape that has the greatest number of reconcile events in its reconcile database. Using this automatic reconcile operation should negate the need for a manual reconcile operation or, if a manual reconcile operation is still required, the execution time of the manual reconcile operation should be much shorter. In addition, since an automatic reconcile is processed only when a tape exchange is not required or a system resource is in the idle state, this method minimizes the performance impact on the system.

Embodiments of the present invention use an implementation of an event based reconcile operation. In an embodiment, the basic reconcile operation updates tapes with the deletion and/or renaming of stub files on the primary storage. The deletion and renaming operations are referred to as events. To realize this operation, in an embodiment, each time a deletion or renaming event occurs on a stub file, the deletion or renaming event is recorded in a reconcile database such as reconcile database 232 of FIG. 2a, and the deletion and renaming events recorded in the database are written to the corresponding tape when the reconcile function is performed. Such a reconcile function is called an event based reconcile function.

In an embodiment of an HSM using DMAPI, these events can be monitored by associating hook functions with the events. A hook function is a means of executing custom code either before, after, or instead of existing code. In an embodiment, the hook functions can obtain information (e.g., the file path of the deleted stub file, and file paths before and after the renaming) necessary for the reconcile operations. A reconcile database is used to record information from the hooked events. In an embodiment, the reconcile database has a table for each tape. In an embodiment, each table has, at least, the columns illustrated in FIG. 2b.

A key aspect of embodiments of the present invention is the ability to monitor both operations to the reconcile database and operations on the tape drive and/or the mounted tape, and to automatically perform a reconcile operation on a tape at an appropriate time, as discussed below.

FIG. 1 is a functional block diagram illustrating a distributed data processing environment, generally designated 100, suitable for operation of automatic reconciliation program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and computing device 130 connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110, computing device 130, and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers) that act as a single pool of seamless resources when accessed within distributed data processing environment 100.

In an embodiment, computing device 110 includes automatic reconciliation program 112. In an embodiment, automatic reconciliation program 112 is a program, application, or subprogram of a larger program for intelligent connection placement across multiple logical ports. In an alternative embodiment, automatic reconciliation program 112 may be located on any other device accessible by computing device 110 via network 120.

In an embodiment, computing device 110 includes information repository 114. In an embodiment, information repository 114 may be managed by automatic reconciliation program 112. In an alternate embodiment, information repository 114 may be managed by the operating system of the device, alone, or together with, automatic reconciliation program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, system configuration data, storage system (HSM) configuration data, filesystem data, and other data that is received by automatic reconciliation program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the information repository 114 may be implemented with any suitable storage architecture known in the art, such as a relational database, an object-oriented database, or one or more tables.

In an embodiment, computing device 110 includes reconcile database 116. In an embodiment, reconcile database 116 may be managed by automatic reconciliation program 112. In an alternate embodiment, reconcile database 116 may be managed by the operating system of the device, alone, or together with, automatic reconciliation program 112. Reconcile database 116 is a data repository that can store event information for the HSM. In some embodiments, reconcile database 116 is located externally to computing device 110 and accessed through a communication network, such as network 120. In some embodiments, reconcile database 116 is stored on computing device 110. In some embodiments, reconcile database 116 may reside on another computing device (not shown), provided that reconcile database 116 is accessible by computing device 110.

Distributed data processing environment 100 includes computing device 130. Computing device 130 can be a storage device, such as a tape drive or tape drive system, a standalone computing device incorporating a storage device, a management server incorporating a storage device, or any other storage device capable of receiving, sending, and processing HSM event data, and capable of communicating with other computing devices (not shown) within distributed data processing environment 100 via network 120. Storage on computing device 130 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, the storage on computing device 130 may be implemented with any suitable storage architecture known in the art, such as a relational database, an object-oriented database, or one or more tables.

Figures 2A, 2B:
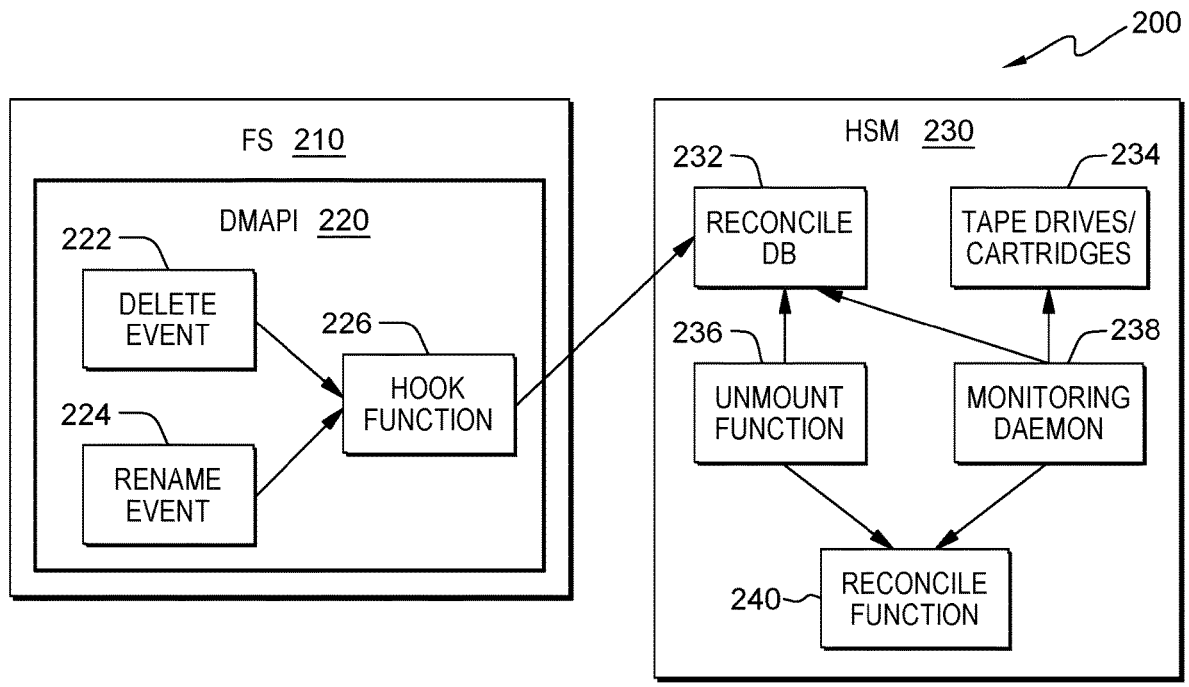
FIG. 2a is a process diagram of the automatic reconciliation program, in accordance with an embodiment of the present invention.
FIG. 2b is an illustration of a reconcile database, in accordance with an embodiment of the present invention.

FIG. 2a is a process diagram of automatic reconciliation program 112, generally designated 200, in accordance with an embodiment of the invention.

Process diagram 200 includes filesystem (FS) 210, which is the filesystem for the HSM. FS 210 also includes DMAPI 220, which is the API used by the HSM and which includes the event feature that is used by embodiments of the present invention. DMAPI 220 includes two events necessary for the invention, delete event 222 and rename event 224. As the event names imply, delete event 222 tracks when stub files are deleted from the primary storage, and rename event 224 tracks when stub files on the primary storage are renamed. DMAPI 220 also includes hook function 226. Hook function 226 is a function that can connect, or "hook up," to DMAPI 220 events delete event 222 and rename event 224 to signal automatic reconciliation program 112 that the event has occurred, to enable automatic reconciliation program 112 to update reconcile database 116 with file migration records of the filesystem events. This allows automatic reconciliation program 112 to keep reconcile database 116 current with the state of file transaction on the HSM in order to perform automatic reconciliation of data on the HSM tape drive or drives without affecting system performance.

Process diagram 200 includes HSM 230. This is the HSM for the system as describe above. HSM 230 includes reconcile database 232 (which is the same as reconcile database 116 of FIG. 1), as described above, and tape drives/cartridges 234, the physical tape drives. HSM 230 includes reconcile function 240, which was described above. In embodiments of the present invention, the mechanism that determines the timing at which the reconcile operation is automatically performed is described below, in FIGS. 3 and 4. These mechanisms are unmount function 236, which is described in detail in FIG. 3, and monitoring daemon 238, which is described in detail in FIG. 4.

Figure 3:
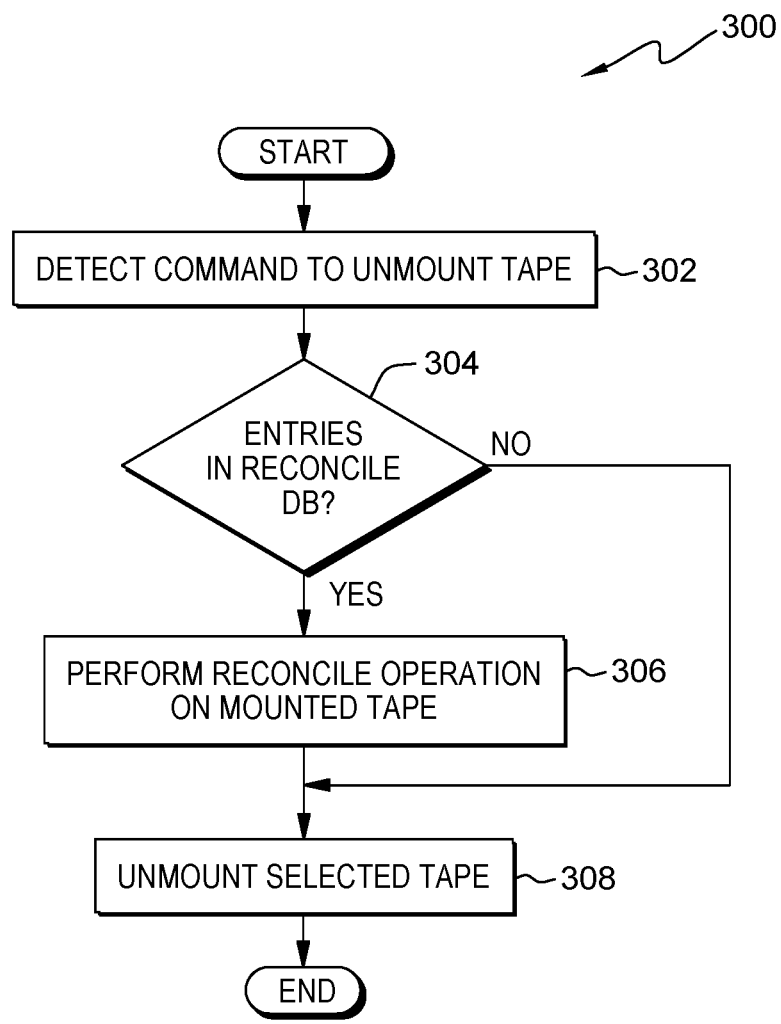
FIG. 3 is a flowchart depicting operational steps of the automatic reconciliation program to reconcile a tape before unmounting, on a computing device within the distributed data processing environment of FIG. 1, in accordance with an embodiment of the present invention.

FIG. 3 is a flow chart diagram of workflow 300 depicting operational steps for unmount function 236 of automatic reconciliation program 112 for automatic reconciliation of data on the HSM tape drive or drives without affecting system performance. In an alternative embodiment, the steps of workflow 300 may be performed by any other program while working with automatic reconciliation program 112. In an embodiment, automatic reconciliation program 112, while monitoring HSM 230 via DMAPI 220, detects that a command has been issued to a tape drive on HSM 230 to unmount the currently mounted tape. In an embodiment, automatic reconciliation program 112 determines if there are entries in reconcile database 216 for the currently mounted tape that is about to be unmounted. In an embodiment, if automatic reconciliation program 112 determines that there are entries in reconcile database 216 for the tape that is about to be unmounted, then automatic reconciliation program 112 performs reconcile function 240 on the mounted tape. In an embodiment, if either there were no entries for this tape in reconcile database 232, or reconcile function 240 has completed, then automatic reconciliation program 112 unmounts the tape that is currently mounted in the tape drive.

It should be appreciated that embodiments of the present invention provide at least for the unmount function 236 portion of the automatic reconciliation of data on the HSM tape drive or drives without affecting system performance. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 3 illustrates one possible iteration of automatic reconciliation program 112, which repeats each time an unmount command is issued for a tape drive connected to the HSM, such as tape drives/cartridges 234.

Automatic reconciliation program 112 detects a command to unmount a tape (step 302). In an embodiment, automatic reconciliation program 112, while monitoring HSM 230 via DMAPI 220, detects that a command has been issued to a tape drive on HSM 230 to unmount the currently mounted tape.

Automatic reconciliation program 112 determines if there are entries in reconcile database 232 (decision block 304). In an embodiment, automatic reconciliation program 112 determines if there are entries in reconcile database 216 for the currently mounted tape that is about to be unmounted. In an embodiment, if automatic reconciliation program 112 determines that there are no entries in reconcile database 216 for the tape that is about to be unmounted ("no" branch, decision block 304), then automatic reconciliation program 112 proceeds to step 308 to unmount the current tape.

Automatic reconciliation program 112 performs a reconcile function 240 on the mounted tape (step 306). In an embodiment, if automatic reconciliation program 112 determines that there are entries in reconcile database 216 for the tape that is about to be unmounted ("yes" branch, decision block 304), then automatic reconciliation program 112 performs reconcile function 240 on the mounted tape.

Automatic reconciliation program 112 unmounts the selected tape (step 308). In an embodiment, if either there were no entries for this tape in reconcile database 232, or reconcile function 240 has completed, then automatic reconciliation program 112 unmounts the tape that is currently mounted in the tape drive.

Figure 4:
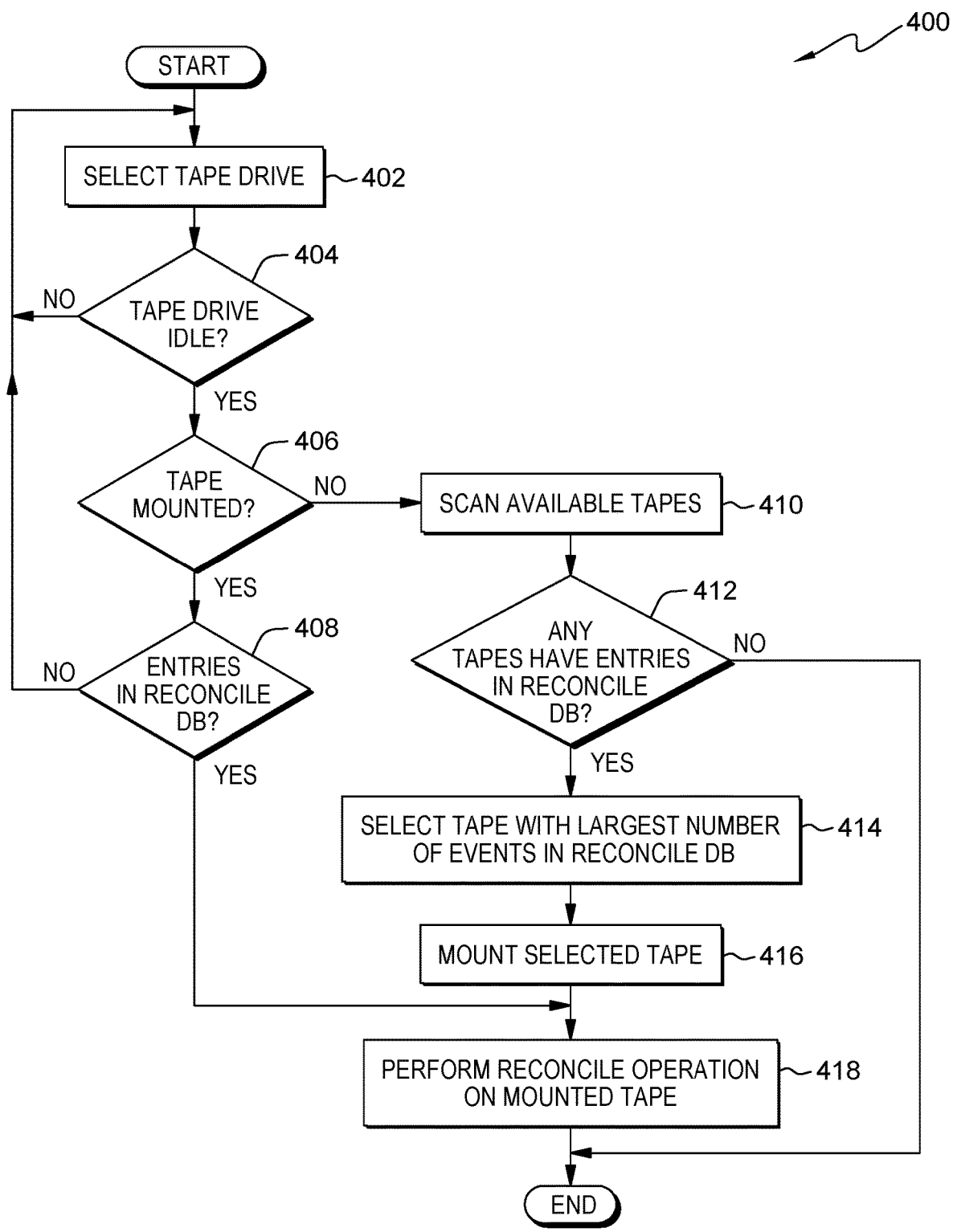
FIG. 4 is a flowchart depicting operational steps of the automatic reconciliation program to reconcile a tape while the tape drive is idle, on a computing device within the distributed data processing environment of FIG. 1, in accordance with an embodiment of the present invention.

FIG. 4 is a flow chart diagram of workflow 400 depicting operational steps for the monitoring daemon 238 of automatic reconciliation program 112 for automatic reconciliation of data on the HSM tape drive or drives without affecting system performance. In an alternative embodiment, the steps of workflow 400 may be performed by any other program while working with automatic reconciliation program 112. In an embodiment, automatic reconciliation program 112 selects an available tape drive, e.g., tape drive/cartridge 234 from FIG. 2a, that is part of HSM 230. In an embodiment, automatic reconciliation program 112 determines if the selected tape drive is currently idle. In an embodiment, if automatic reconciliation program 112 determines that the selected tape drive is currently idle, then automatic reconciliation program 112 determines if a tape is mounted in the current drive. In an embodiment, if automatic reconciliation program 112 determines that a tape is mounted in the current drive, then automatic reconciliation program 112 determines if there are entries in reconcile database 232 for the tape that is currently mounted in the tape drive. In an embodiment, if automatic reconciliation program 112 determines that no tape is currently mounted in the selected tape drive, then automatic reconciliation program 112 scans the tapes that are available for the current tape drive to determine if any of the tapes have entries in reconcile database 232. In an embodiment, automatic reconciliation program 112 determines if there are any tapes available for the current tape drive that have entries in reconcile database 232. In an embodiment, if automatic reconciliation program 112 determines that there are tapes available for the current tape drive that have entries in reconcile database 232, then automatic reconciliation program 112 selects the tape that has the most entries in reconcile database 232. In an embodiment, automatic reconciliation program 112 mounts the tape that has the most entries in reconcile database 232 that was selected in step 414. In an embodiment, automatic reconciliation program 112 performs reconcile function 240 on the tape that is currently mounted in the selected tape drive.

It should be appreciated that embodiments of the present invention provide at least for the monitoring daemon 238 portion of the automatic reconciliation of data on the HSM tape drive or drives without affecting system performance. However, FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

It should be appreciated that the process depicted in FIG. 4 is illustrates one possible iteration of automatic reconciliation program 112, which repeats continuously.

Automatic reconciliation program 112 selects a tape drive (step 402). In an embodiment, automatic reconciliation program 112 selects an available tape drive, e.g., tape drive/cartridge 234 from FIG. 2a, that is part of HSM 230.

Automatic reconciliation program 112 determines if the tape drive is idle (decision block 404). In an embodiment, automatic reconciliation program 112 determines if the selected tape drive is currently idle. If automatic reconciliation program 112 determines that the selected tape drive is not currently idle ("no" branch, decision block 404), then automatic reconciliation program 112 returns to step 402 to select the next tape drive in HSM 230.

Automatic reconciliation program 112 determines if a tape is mounted (decision block 406). In an embodiment, if automatic reconciliation program 112 determines that the selected tape drive is currently idle ("yes" branch, decision block 404), then automatic reconciliation program 112 determines if a tape is mounted in the current drive. If automatic reconciliation program 112 determines that a tape is not mounted in the current drive ("no" branch, decision block 406), then automatic reconciliation program 112 proceeds to step 410 to scan the available tapes for this tape drive.

Automatic reconciliation program 112 determines if there are entries in reconcile database 232 (decision block 408). In an embodiment, if automatic reconciliation program 112 determines that a tape is mounted in the current drive ("yes" branch, decision block 406), then automatic reconciliation program 112 determines if there are entries in reconcile database 232 for the tape that is currently mounted in the tape drive. If automatic reconciliation program 112 determines that there are entries in reconcile database 232 for the tape that is currently mounted in the tape drive ("yes" branch, decision block 408), then automatic reconciliation program 112 proceeds to step 418 to perform reconcile function 240 on the tape that is currently mounted in the tape drive. If automatic reconciliation program 112 determines that there are no entries in reconcile database 232 for the tape that is currently mounted in the tape drive ("no" branch, decision block 408), then automatic reconciliation program 112 returns to step 402 to select the next tape drive in HSM 230.

Automatic reconciliation program 112 scans the available tapes (step 410). In an embodiment, if automatic reconciliation program 112 determines that no tape is currently mounted in the selected tape drive ("no" branch, decision block 406), then automatic reconciliation program 112 scans the tapes that are available for the current tape drive to determine if any of the tapes have entries in reconcile database 232.

Automatic reconciliation program 112 determines if there are any tapes that have entries in reconcile database 232 (decision block 412). In an embodiment, automatic reconciliation program 112 determines if there are any tapes available for the current tape drive that have entries in reconcile database 232. If automatic reconciliation program 112 determines that there are no tapes available for the current tape drive that have entries in reconcile database 232 ("no" branch, decision block 412), then automatic reconciliation program 112 ends for this cycle.

Automatic reconciliation program 112 select tape with largest number of events in reconcile database 232 (step 414). In an embodiment, if automatic reconciliation program 112 determines that there are tapes available for the current tape drive that have entries in reconcile database 232 ("yes" branch, decision block 412), then automatic reconciliation program 112 selects the tape that has the most entries in reconcile database 232.

Automatic reconciliation program 112 mounts the selected tape (step 416). In an embodiment, automatic reconciliation program 112 mounts the tape that has the most entries in reconcile database 232 that was selected in step 414 in the selected tape drive.

Automatic reconciliation program 112 performs reconcile function 240 on the mounted tape (step 418). In an embodiment, automatic reconciliation program 112 performs reconcile function 240 on the tape that is currently mounted in the selected tape drive. Automatic reconciliation program 112 then ends for this cycle.

Figure 5:
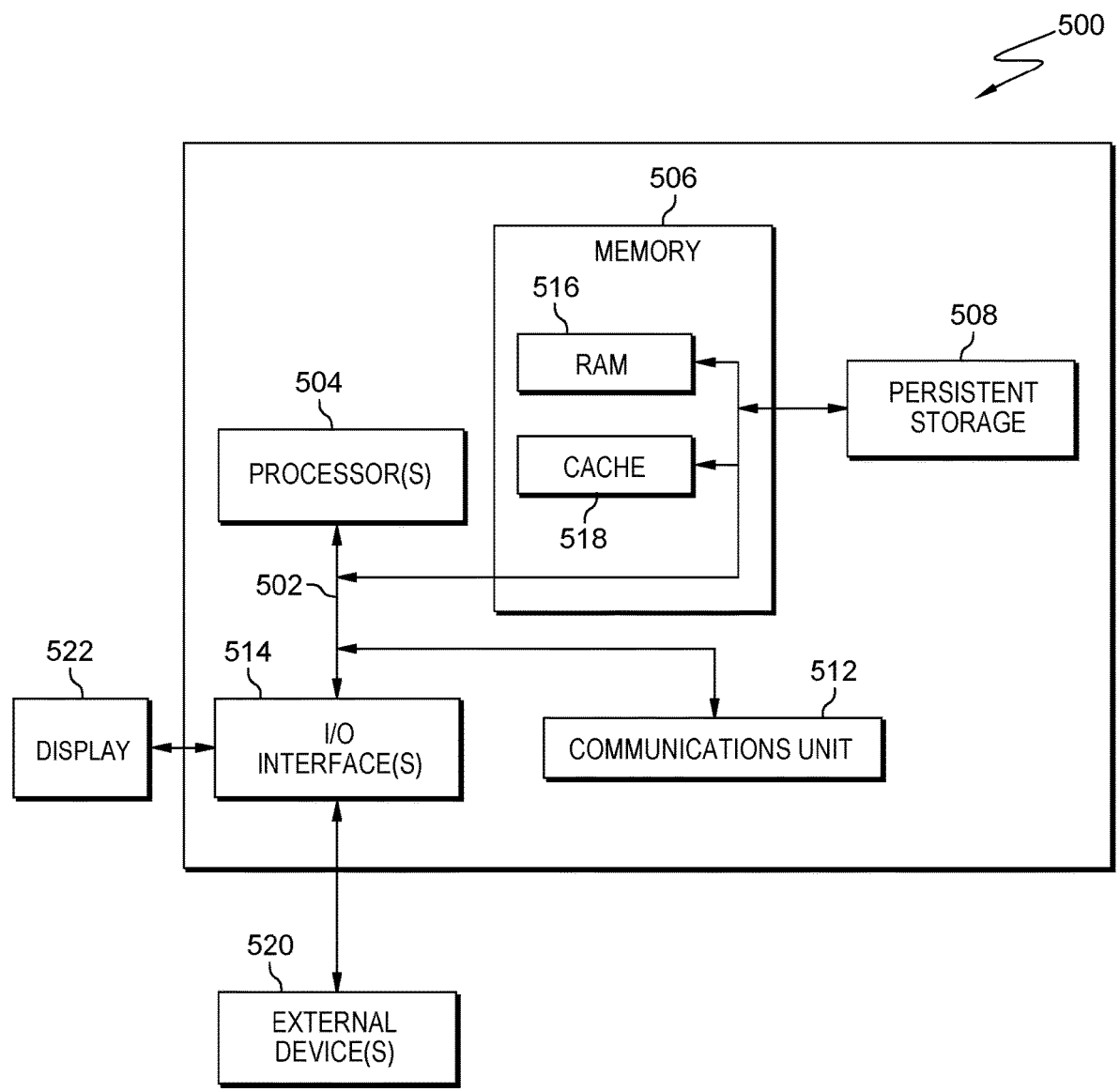
FIG. 5 depicts a block diagram of components of the computing devices executing the automatic reconciliation program within the distributed data processing environment of FIG. 1, in accordance with an embodiment of the present invention.

FIG. 5 is a block diagram depicting components of computing device 110 suitable for automatic reconciliation program 112, in accordance with at least one embodiment of the invention. FIG. 5 displays the computer 500, one or more processor(s) 504 (including one or more computer processors), a communications fabric 502, a memory 506 including, a random-access memory (RAM) 516, and a cache 518, a persistent storage 508, a communications unit 512, I/O interfaces 514, a display 522, and external devices 520. It should be appreciated that FIG. 5 provides only an illustration of one embodiment and does not imply any limitations with regard to the environments in which different embodiments may be implemented. Many modifications to the depicted environment may be made.

As depicted, the computer 500 operates over the communications fabric 502, which provides communications between the computer processor(s) 504, memory 506, persistent storage 508, communications unit 512, and I/O interface(s) 514. The communications fabric 502 may be implemented with an architecture suitable for passing data or control information between the processors 504 (e.g., microprocessors, communications processors, and network processors), the memory 506, the external devices 520, and any other hardware components within a system. For example, the communications fabric 502 may be implemented with one or more buses.

The memory 506 and persistent storage 508 are computer readable storage media. In the depicted embodiment, the memory 506 comprises a RAM 516 and a cache 518. In general, the memory 506 can include any suitable volatile or non-volatile computer readable storage media. Cache 518 is a fast memory that enhances the performance of processor(s) 504 by holding recently accessed data, and near recently accessed data, from RAM 516.

Program instructions for automatic reconciliation program 112 may be stored in the persistent storage 508, or more generally, any computer readable storage media, for execution by one or more of the respective computer processors 504 via one or more memories of the memory 506. The persistent storage 508 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

The communications unit 512, in these examples, provides for communications with other data processing systems or devices. In these examples, the communications unit 512 includes one or more network interface cards. The communications unit 512 may provide communications through the use of either or both physical and wireless communications links. In the context of some embodiments of the present invention, the source of the various input data may be physically remote to the computer 500 such that the input data may be received, and the output similarly transmitted via the communications unit 512.

The I/O interface(s) 514 allows for input and output of data with other devices that may be connected to computer 500. For example, the I/O interface(s) 514 may provide a connection to external device(s) 520 such as a keyboard, a keypad, a touch screen, a microphone, a digital camera, and/or some other suitable input device. External device(s) 520 can also include portable computer readable storage media such as, for example, thumb drives, portable optical or magnetic disks, and memory cards. Software and data used to practice embodiments of the present invention, e.g., automatic reconciliation program 112, can be stored on such portable computer readable storage media and can be loaded onto persistent storage 508 via the I/O interface(s) 514. I/O interface(s) 514 also connect to a display 522.

Display 522 provides a mechanism to display data to a user and may be, for example, a computer monitor. Display 522 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for automatic data reconciliation, the computer-implemented method comprising:
   responsive to migrating a file on a hierarchical storage system from a primary storage to one or more tape drives, recording, by one or more computer processors, one or more file migration records in a reconcile database;
   responsive to the occurrence of a file event on the primary storage, updating, by the one or more computer processors, the one or more file migration records in the reconcile database, wherein the file event is chosen from the group consisting of a delete operation and a rename operation; and
   responsive to receiving a command to unmount a first mounted tape on one tape drive of the one or more tape drives, performing, by the one or more computer processors, a reconcile function on the first mounted tape on the one tape drive of the one or more tape drives, wherein the reconcile function updates the first mounted tape with the one or more file migration records in the reconcile database.

2. The computer-implemented method of claim 1, wherein responsive to receiving a command to unmount the first mounted tape on the one tape drive of the one or more tape drives, performing the reconcile function on the first mounted tape on the one tape drive of the one or more tape drives, comprises:
   receiving, by the one or more computer processors, a signal to unmount the first mounted tape on the one tape drive of the one or more tape drives;
   searching, by the one or more computer processors, the reconcile database for one or more file migration records for the first mounted tape;
   responsive to the reconcile database containing one or more file migration records for the first mounted tape, performing, by the one or more computer processors, the reconcile function on the first mounted tape, wherein the reconcile function updates the first mounted tape with the one or more file migration records in the reconcile database; and
   unmounting, by the one or more computer processors, the first mounted tape.

3. The computer-implemented method of claim 1, further comprising:
   selecting, by the one or more computer processors, a first tape drive of the one or more tape drives;
   determining, by the one or more computer processors, if the first tape drive of the one or more tape drives is in an idle state;
   responsive to determining that the first tape drive of the one or more tape drives is in an idle state, determining, by the one or more computer processors, if the time that the first tape drive of the one or more tape drives is in an idle state exceeds a threshold;
   responsive to determining the time that the first tape drive of the one or more tape drives is in an idle state exceeds a threshold, determining, by the one or more computer processors, if an online tape is mounted in the first tape drive of the one or more tape drives;
   responsive to determining that the online tape is mounted in the first tape drive of the one or more tape drives, determining, by the one or more computer processors, if one or more file migration records for the online tape exist in the reconcile database; and
   responsive to determining that one or more file migration records for the online tape exist in the reconcile database, performing, by the one or more computer processors, the reconcile function on the online tape, wherein the reconcile function updates the online tape with the one or more file migration records in the reconcile database.

4. The computer-implemented method of claim 3, further comprising:
   responsive to determining that an online tape is not mounted in the first tape drive of the one or more tape drives, determining, by the one or more computer processors, if one or more file migration records exist in the reconcile database for one or more offline tapes for the first tape drive of the one or more tape drives;
   responsive to determining that the one or more file migration records exist in the reconcile database for the one or more offline tapes for the first tape drive of the one or more tape drives, selecting, by the one or more computer processors, one of the one or more offline tapes, wherein the one of the one or more offline tapes has a largest number of file migration records in the reconcile database;
   mounting, by the one or more computer processors, the one of the one or more offline tapes; and
   performing, by the one or more computer processors, the reconcile function on the one of the one or more offline tapes.

5. The computer-implemented method of claim 1, wherein migrating a file on a hierarchical storage system from a primary storage to one or more tape drives further comprises creating a stub file on the primary storage containing a metadata of the migrated file.

6. The computer-implemented method of claim 1, wherein the file migration records in the reconcile database contain at least an event type, a first file path, and a second file path.

7. The computer-implemented method of claim 1, wherein the primary storage contains solid state disk drives.

8. A computer program product for automatic data reconciliation, the computer program product comprising one or more computer readable storage media and program instructions stored on the one or more computer readable storage media, the program instructions including instructions to:
   responsive to migrating a file on a hierarchical storage system from a primary storage to one or more tape drives, record one or more file migration records in a reconcile database;
   responsive to the occurrence of a file event on the primary storage, update the one or more file migration records in the reconcile database, wherein the file event is chosen from the group consisting of a delete operation and a rename operation; and
   responsive to receiving a command to unmount a first mounted tape on one tape drive of the one or more tape drives, perform a reconcile function on the first mounted tape on the one tape drive of the one or more tape drives, wherein the reconcile function updates the first mounted tape with the one or more file migration records in the reconcile database.

9. The computer program product of claim 8, wherein responsive to receiving a command to unmount the first mounted tape on the one tape drive of the one or more tape drives, performing the reconcile function on the first mounted tape on the one tape drive of the one or more tape drives, comprises one or more of the following program instructions, stored on the one or more computer readable storage media, to:
- receive a signal to unmount the first mounted tape on the one tape drive of the one or more tape drives;
- search the reconcile database for one or more file migration records for the first mounted tape;
- responsive to the reconcile database containing one or more file migration records for the first mounted tape, perform the reconcile function on the first mounted tape, wherein the reconcile function updates the first mounted tape with the one or more file migration records in the reconcile database; and
- unmount the first mounted tape.

10. The computer program product of claim 8, further comprises one or more of the following program instructions, stored on the one or more computer readable storage media, to:
- select a first tape drive of the one or more tape drives;
- determine if the first tape drive of the one or more tape drives is in an idle state;
- responsive to determining that the first tape drive of the one or more tape drives is in an idle state, determine if the time that the first tape drive of the one or more tape drives is in an idle state exceeds a threshold;
- responsive to determining the time that the first tape drive of the one or more tape drives is in an idle state exceeds a threshold, determine if an online tape is mounted in the first tape drive of the one or more tape drives;
- responsive to determining that the online tape is mounted in the first tape drive of the one or more tape drives, determine if one or more file migration records for the online tape exist in the reconcile database; and
- responsive to determining that one or more file migration records for the online tape exist in the reconcile database, perform the reconcile function on the online tape, wherein the reconcile function updates the online tape with the one or more file migration records in the reconcile database.

11. The computer program product of claim 10, further comprising one or more of the following program instructions, stored on the one or more computer readable storage media, to:
- responsive to determining that an online tape is not mounted in the first tape drive of the one or more tape drives, determine if one or more file migration records exist in the reconcile database for one or more offline tapes for the first tape drive of the one or more tape drives;
- responsive to determining that the one or more file migration records exist in the reconcile database for the one or more offline tapes for the first tape drive of the one or more tape drives, select one of the one or more offline tapes, wherein the one of the one or more offline tapes has a largest number of file migration records in the reconcile database;
- mount the one of the one or more offline tapes; and
- perform the reconcile function on the one of the one or more offline tapes.

12. The computer program product of claim 8, wherein migrating a file on a hierarchical storage system from a primary storage to one or more tape drives further comprises creating a stub file on the primary storage containing a metadata of the migrated file.

13. The computer program product of claim 8, wherein the file migration records in the reconcile database contain at least an event type, a first file path, and a second file path.

14. The computer program product of claim 8, wherein the primary storage contains solid state disk drives.

15. A computer system for automatic data reconciliation, the computer system comprising:
- one or more computer processors;
- one or more computer readable storage media; and
- program instructions stored on the one or more computer readable storage media for execution by at least one of the one or more computer processors, the stored program instructions including instructions to:
  - responsive to migrating a file on a hierarchical storage system from a primary storage to one or more tape drives, record one or more file migration records in a reconcile database;
  - responsive to the occurrence of a file event on the primary storage, update the one or more file migration records in the reconcile database, wherein the file event is chosen from the group consisting of a delete operation and a rename operation; and
  - responsive to receiving a command to unmount a first mounted tape on one tape drive of the one or more tape drives, perform a reconcile function on the first mounted tape on the one tape drive of the one or more tape drives, wherein the reconcile function updates the first mounted tape with the one or more file migration records in the reconcile database.

16. The computer system of claim 15, wherein responsive to receiving a command to unmount the first mounted tape on the one tape drive of the one or more tape drives, performing the reconcile function on the first mounted tape on the one tape drive of the one or more tape drives, comprises one or more of the following program instructions, stored on the one or more computer readable storage media, to:
- receive a signal to unmount the first mounted tape on the one tape drive of the one or more tape drives;
- search the reconcile database for one or more file migration records for the first mounted tape;
- responsive to the reconcile database containing one or more file migration records for the first mounted tape, perform the reconcile function on the first mounted tape, wherein the reconcile function updates the first mounted tape with the one or more file migration records in the reconcile database; and
- unmount the first mounted tape.

17. The computer system of claim 15, further comprises one or more of the following program instructions, stored on the one or more computer readable storage media, to:
- select a first tape drive of the one or more tape drives;
- determine if the first tape drive of the one or more tape drives is in an idle state;
- responsive to determining that the first tape drive of the one or more tape drives is in an idle state, determine if the time that the first tape drive of the one or more tape drives is in an idle state exceeds a threshold;
- responsive to determining the time that the first tape drive of the one or more tape drives is in an idle state exceeds a threshold, determine if an online tape is mounted in the first tape drive of the one or more tape drives;
- responsive to determining that the online tape is mounted in the first tape drive of the one or more tape drives, determine if one or more file migration records for the online tape exist in the reconcile database; and responsive to determining that one or more file migration records for the online tape exist in the reconcile database, perform the reconcile function on the online tape, wherein the reconcile function updates the online tape with the one or more file migration records in the reconcile database.

18. The computer system of claim 17, further comprising one or more of the following program instructions, stored on the one or more computer readable storage media, to:

responsive to determining that an online tape is not mounted in the first tape drive of the one or more tape drives, determine if one or more file migration records exist in the reconcile database for one or more offline tapes for the first tape drive of the one or more tape drives;

responsive to determining that the one or more file migration records exist in the reconcile database for the one or more offline tapes for the first tape drive of the one or more tape drives, select one of the one or more offline tapes, wherein the one of the one or more offline tapes has a largest number of file migration records in the reconcile database;

mount the one of the one or more offline tapes; and perform the reconcile function on the one of the one or more offline tapes.

19. The computer system of claim 15, wherein migrating a file on a hierarchical storage system from a primary storage to one or more tape drives further comprises creating a stub file on the primary storage containing a metadata of the migrated file.

20. The computer system of claim 15, wherein the file migration records in the reconcile database contain at least an event type, a first file path, and a second file path.

* * * * *